Nov. 16, 1965   H. J. P. VON OHAIN ETAL   3,217,488
GAS COOLED COLLOID PROPULSION SYSTEMS
Filed April 22, 1964   2 Sheets-Sheet 1
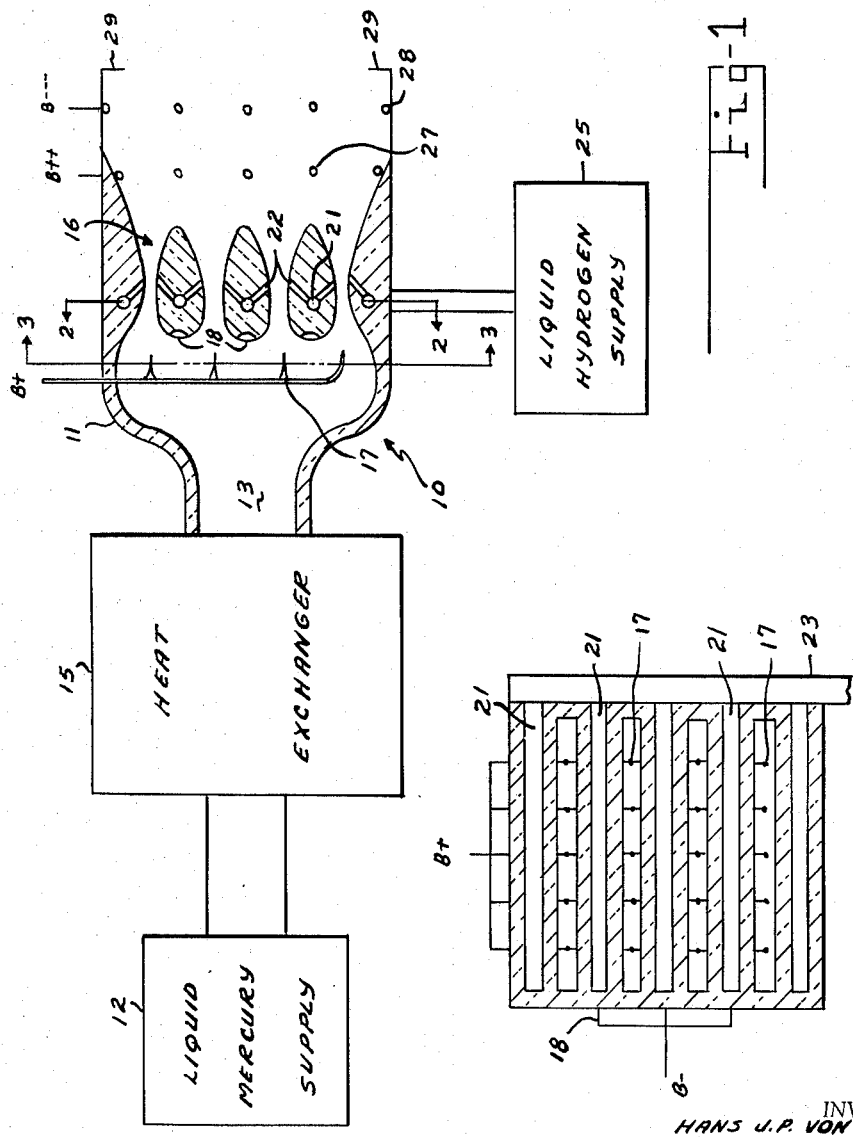
INVENTORS
HANS J.P. VON OHAIN
MAURICE O. LAWSON
SIEGFRIED H. HASINGER
BY

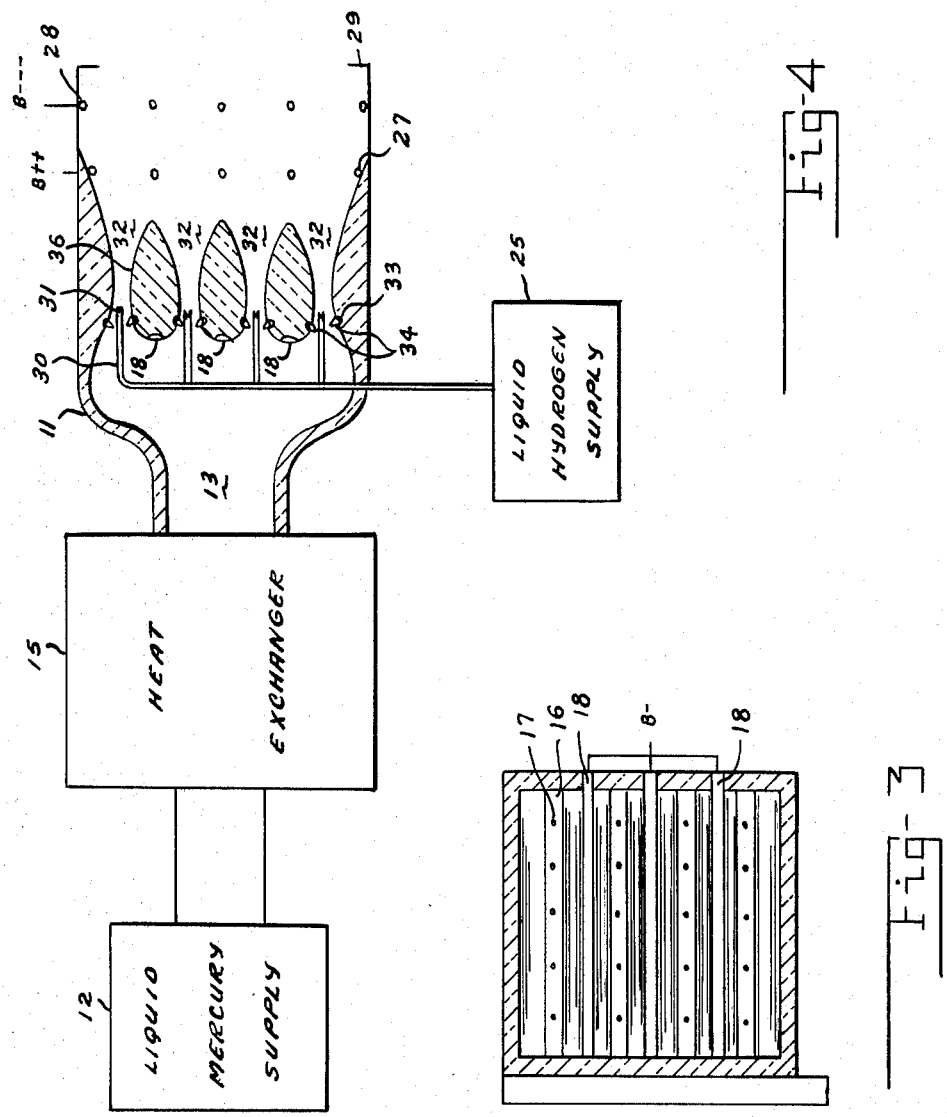

United States Patent Office
3,217,488
Patented Nov. 16, 1965

3,217,488
GAS COOLED COLLOID PROPULSION SYSTEMS
Hans J. P. Von Ohain, Brookville, and Maurice O. Lawson and Siegfried H. Hasinger, Dayton, Ohio, assignors to the United States of America as represented by the Secretary of the Air Force
Filed Apr. 22, 1964, Ser. No. 361,915
3 Claims. (Cl. 60—35.5)
(Granted under Title 35, U.S. Code (1952), sec. 266)

The invention described herein may be manufactured and used by or for the United States Government for governmental purposes without the payment to us of any royalty thereon.

This invention relates to a colloid propulsion system using gas-cooled condensation droplets.

One object of the invention is to provide a colloid propulsion system for increasing the condensation efficiency in a colloid propulsion system.

This and other objects will be more fully understood from the following description taken with the drawing, wherein:

FIG. 1 is a schematic view partially in block form of a propulsion system according to the invention;

FIG. 2 is a sectional view of the device of FIG. 1 along the line 2—2;

FIG. 3 is a sectional view of the device of FIG. 1 along the line 3—3;

FIG. 4 is a schematic view partially in block form of a modification of the propulsion system of FIG. 1.

Colloid propulsion systems, working on the principle of accelerating charged particles by electrostatic forces, use as the operating medium with advantage condensation droplets obtained by expanding vapors through a nozzle. By producing ions in the vapor, condensation takes place mainly around these ions, giving the droplets also their charge.

Unfortunately, in practical cases, not more than about 20 percent of the expanding vapor can be turned into the liquid phase. The approximate 80 percent non-condensed vapor portion would have to be recirculated, causing losses and bulky equipment.

Until now, efforts to overcome this difficulty have gone in the direction of providing radiation cooling for the droplets to offset the heat of condensation. This method has brought only very limited improvements.

The subject of the present invention is a colloid propulsion system, arranged such that light-molecular-weight gas about 5 percent by weight is expanded either together with the vapor or expanded separately and injected into the vapor at an appropriate state of the vapor expansion process, thereby intensively cooling the vapors and absorbing the heat of condensation. The latter occurs on account of the very high specific heats of light molecular-weight gases. For instance, hydrogen has a two-order-of-magnitude higher specific heat than mercury vapor, a material very suitable for colloid propulsion systems.

While light-weight-gas-cooling may be quite generally used to induce condensation in an expanding vapor, the present invention directs the condensation process with gas cooling in such a way that condensation is started by ions contained in the expanding vapor, for instance ions produced by a corona discharge, and cooling gas is added to the vapor to promote condensation around the ions. This results in condensation products consisting of a maximum of charged particles and a minimum of neutrals, the latter ones not being useful for the propulsion process. With the device of this invention 90 percent or more of the expanding liquid can be turned into the liquid phase.

Referring now to the drawing, reference number 10 refers to a propulsion system having a housing 11. The housing shown is merely illustrative as it is obvious that housings having other shapes than that shown may be used. The working medium, such as mercury vapor, from supply tank 12, is fed to the chamber 13 in housing 11 through a heat exchanger or boiler 15. The mercury vapor then passes through the expansion nozzle system 16. A corona discharge system between the needle electrodes 17 and grid-electrode 18 is provided upstream of the expansion nozzle system 16. A light-weight cooling gas such as hydrogen is supplied to the mercury vapor through channels 21 and 22 through a supply tube 23 from hydrogen supply 25. A retarding grid 27 is provided in the path of the charged droplets in chamber 11 to retard the smaller droplets more than the larger droplets. The charged droplets then enter an accelerating field between grids 27 and 28 wherein the charged droplets are accelerated to their final velocity. While only a single acceleration stage is shown, additional stages may be provided if needed for certain applications. A charge neutralizing means is provided at 29 which may be any of the well-known charge neutralizing means, such as are used in ion propulsion systems, for example, heated electron emitters.

In the operation of the device of the invention, saturated or slightly superheated mercury vapor is admitted to the chamber 13 from the boiler or heat exchanger 15. The temperature and pressure of the vapor admitted to chamber 13 will be determined by the environment in which the device is used. For example, for propulsion in the vacuum of space the temperature may be 500° K. at a pressure of $10^{-2}$ atmospheres. Positive ions are formed by the corona discharge produced by the field between needle electrodes 17 and grid 18. When the vapor passes through the expansion nozzle system 16 the vapor is condensed around the positively charged ions.

A low molecular-weight gas, such as hydrogen, is admitted through supply tube 23 and channels to the expansion nozzle system 16 from liquid hydrogen supply 25. Normally, ambient temperature around the hydrogen supply is such that no special heat source is needed to vaporize the liquid hydrogen, however, such a heat source may be provided if needed. The light-weight gas, because of its very high specific heat, absorbs the heat of condensation of the vapor. This, then, adds to the condensation of the vapor around the ions which results in condensation products with a large percentage of charge particles and a low percentage of neutral particles. Grid 27 is connected to a source of positive potential to retard the smaller droplets and to give these smaller droplets more time to grow to provide a more uniform mass-to-charge ratio of the droplets. The charged droplets are then accelerated to their final velocity between electrodes 27 and 28 in the same manner as in ion accelerators.

Electrons are discharged into the stream from radiators 29 to neutralize the charge droplets leaving the propulsion system.

The device of FIG. 3 is identical to that of FIG. 1 except that the cooling gas is supplied through tubular channels 30 and then through nozzles 31 located centrally in the nozzle spaces 32. The conductors 33 for the corona discharge needles 34 are imbedded in the nozzle members 36. The other elements are the same as in FIG. 1 and are given like reference numbers.

While mercury has been described as the vapor, other vapors can be used, for example, water vapor, rubidium vapor and bismuth vapor. Also, low molecular-weight gases other than hydrogen can be used, for example, helium.

There is thus provided a colloid propulsion system using gas-cooled condensation droplets.

While certain specific embodiments are described in detail, it is obvious that many changes may be made with-

We claim:

1. A propulsion system comprising: a chamber, a discharge opening in said chamber, means for producing a corona discharge within said chamber, a plurality of expansion nozzle means within said chamber between said corona discharge producing means and said discharge opening, means for directing a stream of high temperature vapor past said corona discharge producing means through said nozzle means to thereby provide charged vapor particles, means for supplying a high specific heat gas to said vapor adjacent said nozzle means, means between said nozzle means and said discharge opening for providing a retarding field for said charged vapor particles to thereby provide a more uniform mass-to-charge ratio, means between said retarding field means and said discharge opening for accelerating said charged vapor particles and charge neutralizing means adjacent said discharge opening.

2. A propulsion system comprising a chamber, a discharge opening in said chamber, a plurality of needle electrodes within said chamber, a plurality of expansion nozzle means within said chamber between said needle electrodes and said discharge opening, a first grid electrode attached to said nozzle means on the side thereof adjacent said needle electrodes, means for applying a corona discharge potential between said needle electrodes and said first grid electrode, means for directing a stream of high temperature vapor past said needle electrodes through said nozzle means, means for supplying a light molecular-weight gas to said vapor adjacent said nozzle means, a retarding electrode between said nozzle means and said discharge opening, an accelerating electrode between said retarding electrode and said discharge opening and charge neutralizing means adjacent said discharge opening.

3. A propulsion system comprising: a chamber, a discharge opening in said chamber, a plurality of needle electrodes within said chamber, a plurality of expansion nozzle means within said chamber between said needle electrodes and said discharge opening, a first grid electrode attached to said nozzle means on the side thereof adjacent said needle electrodes, means for applying a corona discharge potential between said needle electrodes and said first grid electrode, means for directing a stream of high temperature mercury vapor past said needle electrodes through said nozzle means, means for supplying hydrogen cooling gas to said vapor adjacent said nozzle means, a retarding electrode between said nozzle means and said discharge opening, an accelerating electrode between said retarding electrode and said discharge opening and charge neutralizing means adjacent said discharge opening.

References Cited by the Examiner

UNITED STATES PATENTS

| | | | |
|---|---|---|---|
| 3,119,233 | 1/1964 | Wattendorf et al. | 60—35.5 |
| 3,122,882 | 3/1964 | Schultz et al. | 60—35.5 |
| 3,157,988 | 11/1964 | Schultz | 60—35.5 X |
| 3,173,246 | 3/1965 | Norgren | 60—35.5 X |
| 3,177,654 | 4/1965 | Gradecak | 60—35.5 |

DONLEY J. STOCKING, *Primary Examiner.*

CARLTON R. CROYLE, *Examiner.*